United States Patent [19]

Sakamoto et al.

[11] Patent Number: 5,021,883
[45] Date of Patent: Jun. 4, 1991

[54] ADDRESS CONTROL CIRCUIT FOR A VIDEO MEMORY OF A MULTI-IMAGE DISPLAY VIDEO SYSTEM

[75] Inventors: Noriya Sakamoto; Susumu Komatsu, both of Kanagawa, Japan

[73] Assignee: Kabushiki Kaisha Toshiba, Kanagawa, Japan

[21] Appl. No.: 330,551

[22] Filed: Mar. 30, 1989

[30] Foreign Application Priority Data

Mar. 30, 1988 [JP] Japan .................................. 63-76959

[51] Int. Cl.⁵ .............................................. H04N 5/14
[52] U.S. Cl. ..................................... 358/160; 358/22; 358/183
[58] Field of Search ............... 358/21 R, 22, 148, 160, 358/181, 183

[56] References Cited

U.S. PATENT DOCUMENTS

| | | | |
|---|---|---|---|
| 4,570,181 | 2/1986 | Yamamura | 358/160 |
| 4,729,028 | 3/1988 | Micic et al. | 358/22 |
| 4,746,980 | 5/1988 | Petersen | 358/22 |
| 4,748,504 | 5/1988 | Ikeda et al. | 358/160 |
| 4,862,269 | 8/1989 | Sonoda et al. | 358/160 |

FOREIGN PATENT DOCUMENTS

60-31391 5/1978 Japan .

Primary Examiner—John W. Shepperd
Assistant Examiner—Michael D. Parker
Attorney, Agent, or Firm—Finnegan, Henderson, Farabow, Garrett, and Dunner

[57] ABSTRACT

An address control circuit for a video memory of a multi-image display system. The circuit includes a video signal source, a video memory for storing the video signal, an address holding circuit for controlling write addresses of the video memory which outputs address values during a video image period and holds address value corresponding to a start instance of a blanking period during the blanking period and a bias generating circuit for positioning address areas of the video memory in which the video signal is stored.

7 Claims, 12 Drawing Sheets

(PRIOR ART)

ADDRESS CONTROL CIRCUIT FOR A VIDEO MEMORY OF A MULTI-IMAGE DISPLAY VIDEO SYSTEM

FIELD OF THE INVENTION

The present invention relates generally to an address control circuit for a video memory, and more particularly to an address control circuit for a video memory of a multi-image display system.

BACKGROUND OF THE INVENTION

Recently, there have been developed television receivers having extended functions capable of displaying video images by various display forms on its display. Many of the functions are carried out using video memories. In the functions, there has been known a function for simultaneously displaying multiple channel images by reducing each on a smaller scale on one screen. This function is called the multi-image display function. This multi-image display function is useful, for instance, for checking programs being simultaneously broadcasted in various broadcast stations. Because a viewer can change to a view of his or her favorite channel program only from the multi-image display.

Figure 1:
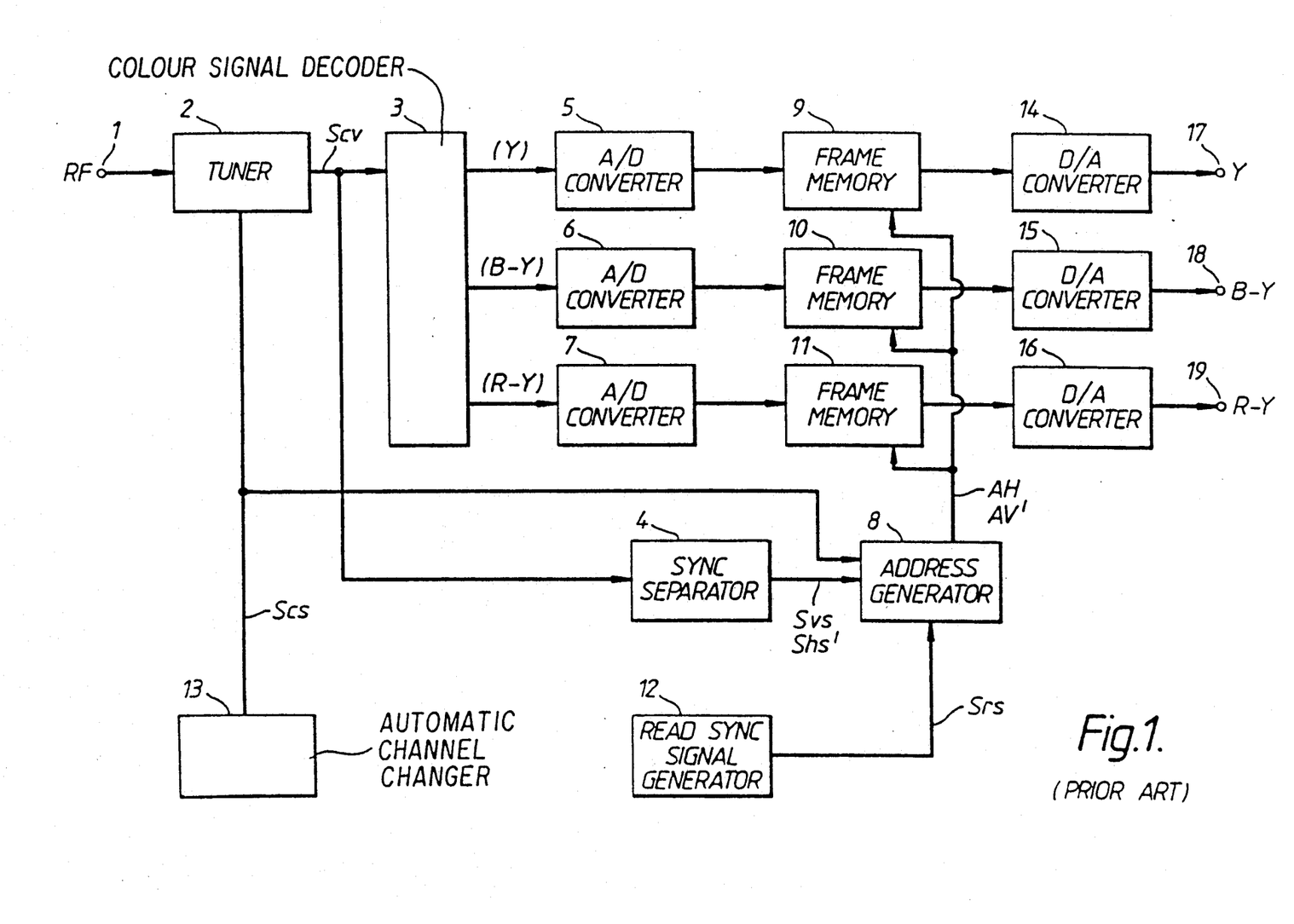
FIG. 1 is a block diagram showing a conventional multi-image display system.

Referring now to FIG. 1, a conventional multi-image display system will be briefly described. FIG. 1 is a block diagram showing an example of the conventional multi-image display system.

In FIG. 1, television broadcast signals Rf are supplied from an input terminal 1 to a tuner 2. The input terminal 1 receives the television broadcast signals Rf through an antenna (not shown). The tuner 2 selects a desired channel program from the television broadcast signals Rf. The tuner 2 further demodulates a composite video signal Scv from the selected television broadcast signal Rf. The composite video signal Scv is supplied to a color signal decoder 3 and a sync separator 4.

The color signal decoder 3 decodes a luminance signal Y and two color difference signals B-Y and R-Y from the composite video signal. The luminance signal Y and the color difference signals B-Y and R-Y are applied to analog-to-digital converters (referred to as A/D converters hereafter) 5, 6 and 7, respectively. Then, outputs from the A/D converters 5, 6 and 7 are supplied to frame memories 9, 10 and 11, respectively.

The sync separator 4 separates a vertical sync signal Svs and a horizontal sync signal Shs from the composite video signal Scv. The vertical sync signal Svs and the horizontal sync signal Shs are supplied to an address generator 8. The address generator 8 generates write addresses for the frame memories 9, 10 and 11 based on the sync signals Svs and Shs. The address generator 8 further generates read addresses based on a read sync signal Srs supplied from a read sync signal generator 12. The read addresses are applied to the frame memories 9, 10 and 11 in a read operation for the frame memories 9, 10 and 11. Respective data read out from the frame memories 9, 10 and 11 are supplied to digital-to-analog converters (referred to as D/A converters hereafter) 14, 15 and 16. The D/A converters 14, 15 and 16 restore the digitalized signals of the luminance signal Y and the color difference signal B-Y and R-Y to their corresponding analog signals. The analog signals of the luminance signal Y and the color difference signal B-Y and R-Y are supplied to a display device (not shown) through output terminals 17, 18 and 19.

Figure 2:
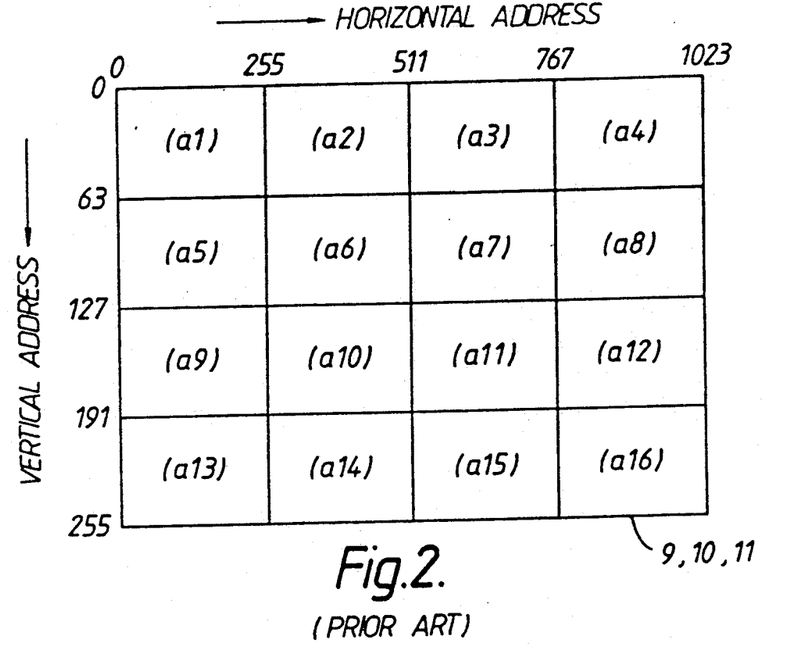
FIG. 2 is a diagram showing a memory address map of the frame memories of FIG. 1.

The address generator 8 sets up a prescribed number of address areas, e.g., sixteen areas a1 to a16, as shown in FIG. 2, in each of the frame memories 9, 10 and 11. The address areas a1 to a16 are designated to sixteen television channels, e.g., channels Ch1 to Ch16 in the order. For example, the address area a2 is mapped to a section having horizontal addresses "256" to "511" and vertical addresses "64" to "127". In total, each frame memories 9, 10 and 11 has the address space having horizontal addresses "0" to "1023" and vertical addresses "0" to "255". Thus, the luminance signal Y and the color difference signal B-Y and R-Y of each channels Ch1 to Ch16 are stored in their designated address areas a1 to a16, respectively.

The color singals Y, B-Y, R-Y stored in the frame memories 9, 10 and 11 have been thinned out to 1/16 times in the writing operation by controlling the write addresses.

Figure 3:
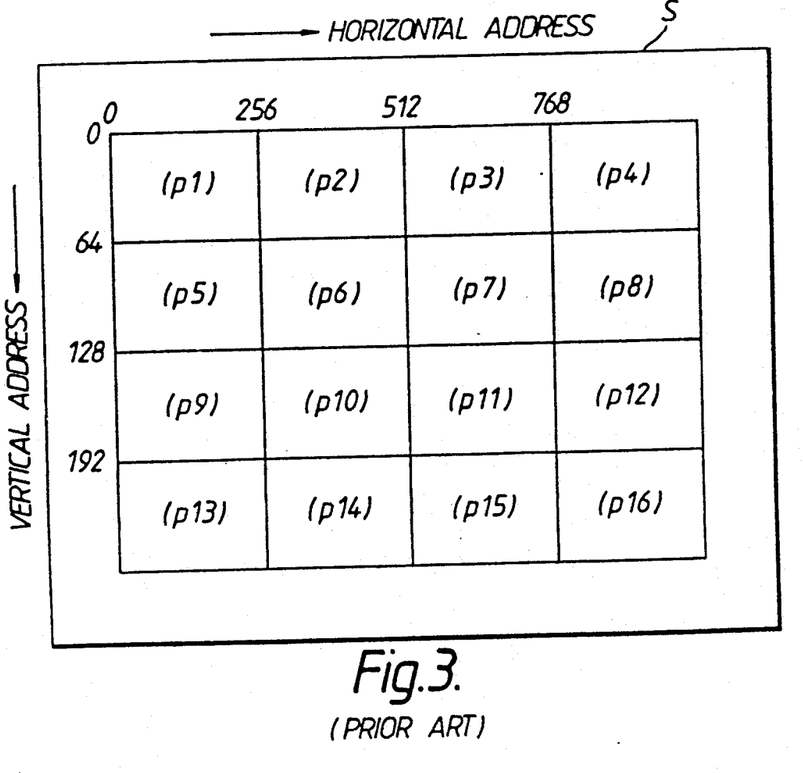
FIG. 3 is a diagram showing a multi-image display image on a display device according to the conventional multi-image display system.

When the stored data of the frame memories 9, 10 and 11 are read out, a displayed image, as shown in FIG. 3, is obtained on a screen S of the display device. In FIG. 3, image areas p1 to p16 correspond to the address areas a1 to a16 of the frame memories 9, 10 and 11. Numerals "0", "256", "512" and "768" along the horizontal direction and numerals "0", "64", "128" and "192" along the horizontal direction indicate bias values, as described later.

The multi-image display system of FIG. 1 further includes an automatic channel changer 13. The automatic channel changer 13 generates a channel sweep signal Scs in the multi-image display operation. The channel sweep signal Scs is applied to the tuner 2 so that the composite video signals Scv of each channels Ch1 to Ch16 are successively output from the tuner 2. The channel sweep signal Scs is also applied to the address generator 8. Thus, the address generator 8 successively generates prescribed write addresses in response to the channels Ch1 to Ch16. The channel sweep operation carried out in the automatic channel changer 13 is not illustrated but may be controlled by a system control circuit, such as a microcomputer.

Figure 4:
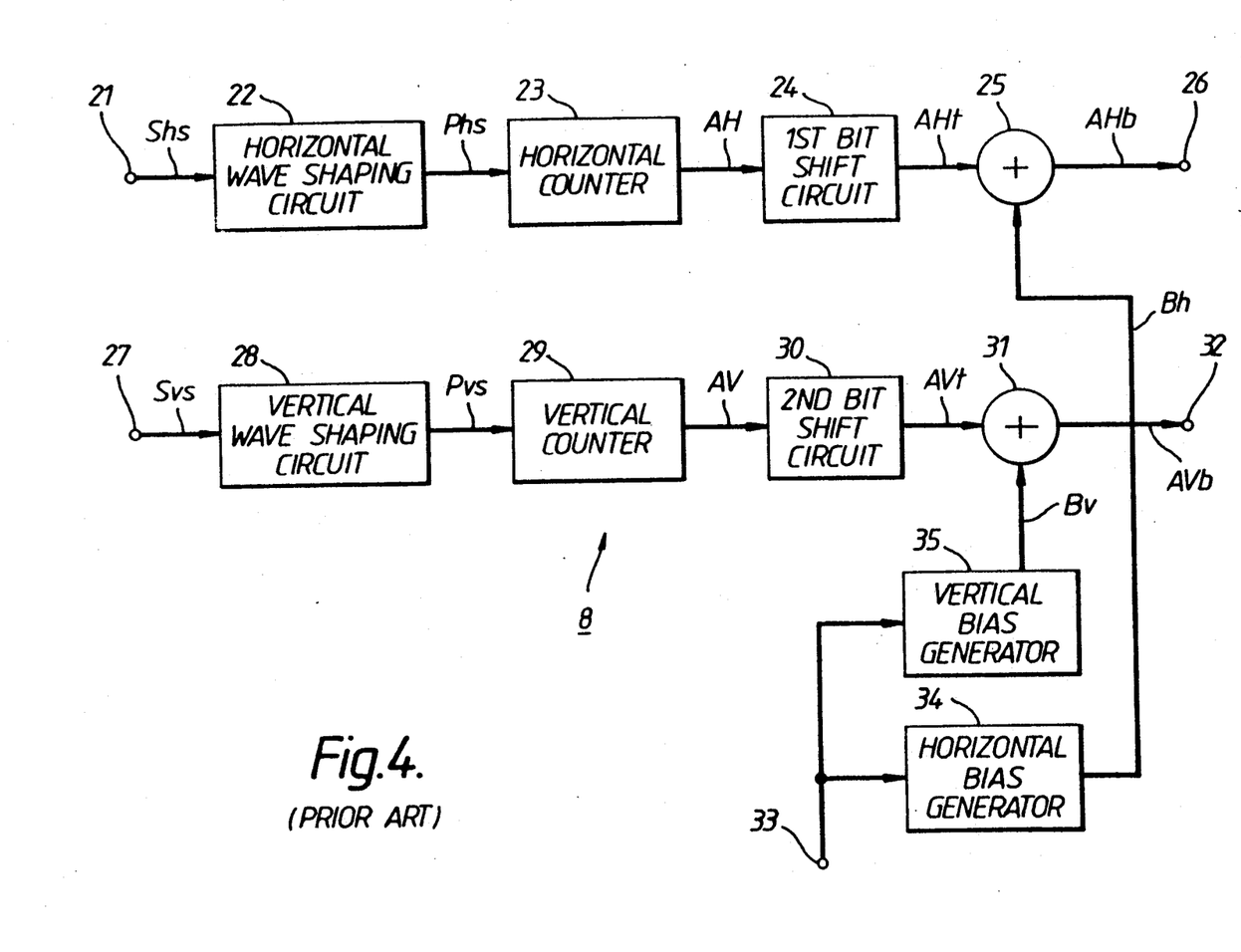
FIG. 4 is a block diagram showing a detail of the address control circuit of FIG. 1.
Figure 5:
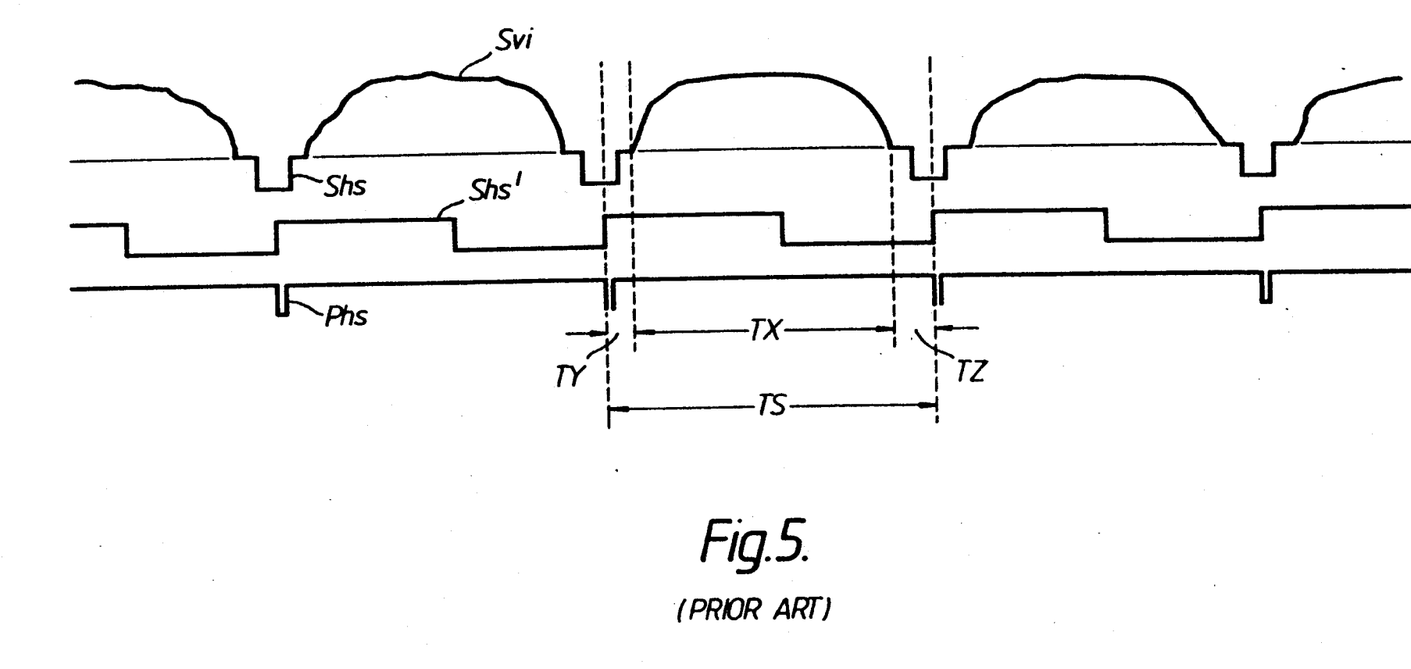
FIG. 5 is a timing chart for explaining the operation of the address control circuit of FIG. 4.

Referring now to FIGS. 4 and 5, an example of the address generator 8 will be described. FIG. 4 is a block diagram showing a detailed circuit of the address generator 8. FIG. 5 is a graph-chart showing the horizontal sync signal Shs and its related signals, as described later.

In FIG. 4, the address generator 8 has two input terminals 21 and 27. These input terminals 21 and 27 are provided for receiving the horizontal and the vertical sync signals Shs and Svs from the sync separator 4 (see FIG. 1).

The horizontal sync signal Shs is placed in a horizontal blanking period between two successive video image signals Svi, as shown by a graph Scv in FIG. 5. The horizontal blanking period comprises a leading blanking period TY in the front of a video image period TX and a following blanking period TZ in the rear of a preceding video image period TX. The graph Scv in FIG. 5 presents the composite video signal Scv. The video signals Svi occur in every horizontal scanning periods TS of the composite video signals Scv. The horizontal sync signal Shs is applied to a horizontal wave shaping circuit 22. The horizontal wave shaping circuit 22 shapes the horizontal sync signal Shs into a signal, as shown by a graph Shs' in FIG. 5. The signal Shs' is further shaped to a pulse signal, as shown by a graph Phs in FIG. 5.

The pulse signal (referred to as horizontal sync pulse hereafter) Phs is supplied to a horizontal counter 20. The horizontal sync pulse Phs resets the horizontal counter 23. The horizontal counter 23 starts a count operation of prescribed clock signals in every reset by the horizontal sync pulse Phs. Thus, the horizontal counter 23 generates horizontal addresses AH as its count data.

The horizontal addresses AH are supplied to a first bit shift circuit 24. The first bit shift circuit 24 thins out the horizontal addresses AH to ¼ times. This thinning operation is achieved by shifting the horizontal addresses AH by two bits. As a result, a thinned horizontal addresses AHt with values "0" to "255" are output while the horizontal addresses AH with values, e.g., "0" to "1023". The thined horizontal addresses AHt are supplied to a first adder 25. The first adder 25 is further coupled to a horizontal bias generator 34.

The first adder 25 adds a prescribed bias value Bh supplied from the horizontal bias generator 34 to the thinned horizontal addresses AHt. Thus, biased horizontal addresses AHb is obtained from the first adder 25. The biased horizontal addresses AHb are supplied to the frame memories 9, 10 and 11 (see FIG. 1) through a horizontal address output terminal 26.

Similar operations are carried out for obtaining biased vertical addresses AVb through a circuit coupled to the input terminal 27.

The vertical sync signal Svs is placed in a vertical blanking period of the composite video signal Scv. The vertical sync signal Svs is applied to a vertical wave shaping circuit 28. The vertical wave shaping circuit 28 shapes the vertical sync signal Svs into a pulse signal Pvs.

The pulse signal (referred to as vertical sync pulse hereafter) Pvs is supplied to a vertical counter 29. The vertical sync pulse Pvs resets the vertical counter 29. The vertical counter 29 starts a count operation of prescribed clock signals in every reset by the vertical sync pulse Pvs. Thus, the vertical counter 29 generates vertical addresses AV as its count data.

The vertical addresses AV are supplied to a second bit shift circuit 30. The second bit shift circuit 30 thins out the vertical addresses AV to ¼ times. This thinning operation is achieved by shifting the vertical addresses AV by two bits. As a result, a thinned vertical addresses AVt with values "0" to "63" are output while the vertical addresses AV with values, e.g., "0" to "255". The thined vertical addresses AVt are supplied to a second adder 31. The second adder 31 is further coupled to a vertical bias generator 35.

The second adder 31 adds a prescribed bias value Bv supplied from the vertical bias generator 35 to the thined vertical addresses AV'. Thus, biased vertical addresses AVb is obtained from the second adder 31. The biased vertical addresses AVb are supplied to the frame memories 9, 10 and 11 (see FIG. 1) through a vertical address output terminal 32.

The bias values Bh and Bv are decided for every image area p1 to p16, as shown in FIG. 3, on the screen S of the display device. For instance, the bias values Bh and Bv for the image area p2 are given values of "256" and "0", respectively. When the selected channel is shifted according to the channel sweep operation, the current channel is displayed on the following image area p3. The bias values Bh and Bv corresponding to the image areas p3 are given values of "512" and "0", respectively. In similar manner, the bias values Bh and Bv corresponding to the image areas p16 are given values of "768" and "192", respectively.

Figure 6:
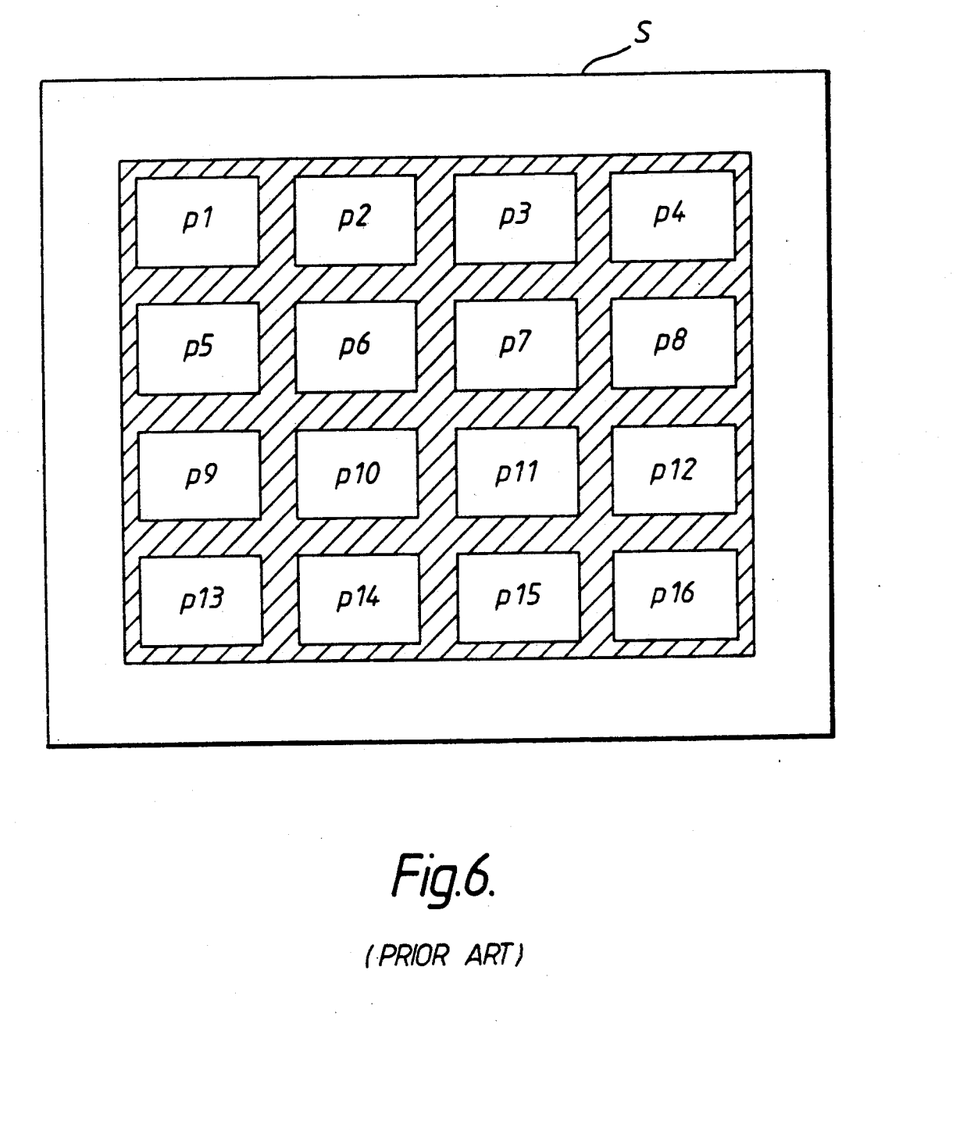
FIG. 6 is a diagram showing a multi-image display image on a display device according to the address control circuit of FIG. 4.

According to the conventional address control circuit for video memories of multi-image display systems, each of the frame memories 9, 10 and 11 stores the data extending in both the entire horizontal scanning period period TS (see FIG. 5) and the entire vertical scanning period period. When the stored data are read out, the image of the multi-image display operation includes horizontal and vertical blanking periods, as shown by hatching line areas in FIG. 6. These areas corresponding to the horizontal and vertical blanking periods make the image shabby. In addition, a portion of each frame memory is fruitlessly used for the data of the blanking periods. In other words, the conventional address control circuit for video memories of multi-image display systems conventional requires memories with relatively large memory capacities.

SUMMARY OF THE INVENTION

Therefore, an object of the present invention is to provide an address control circuit for video memories of multi-image display systems which is able to display a multi-image display system image without portions corresponding to blanking periods.

Another object of the present invention is to provide an address control circuit for video memories of multi-image display systems which is constructed by memories with a relatively small memory capacities.

In order to achieve the above object, an address control circuit for video memories of multi-image display system according to one aspect of the present invention, the circuit includes a video signal source, a video memory for storing the video signal, an address holding circuit for controlling write addresses of the video memory which outputs address values during a video image period and holds address value corresponding to a start instance of a blanking period during the blanking period and a bias generating circuit for positioning address areas of the video memory in which the video signal is stored.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 7 through 13. Throughout the drawings, reference numerals or letters used in FIGS. 1 through 6 (Prior Art) will be used to designate like or equivalent elements for simplicity of explanation.

By the way, the address control circuit for video memories of multi-image display system according to the present invention has a circuit construction similar to the conventional circuit of FIG. 1. However, the circuit according to the present invention includes an improved address generator. Thus, following descriptions will be made for the improved address generator according to the present invention.

Figure 7:
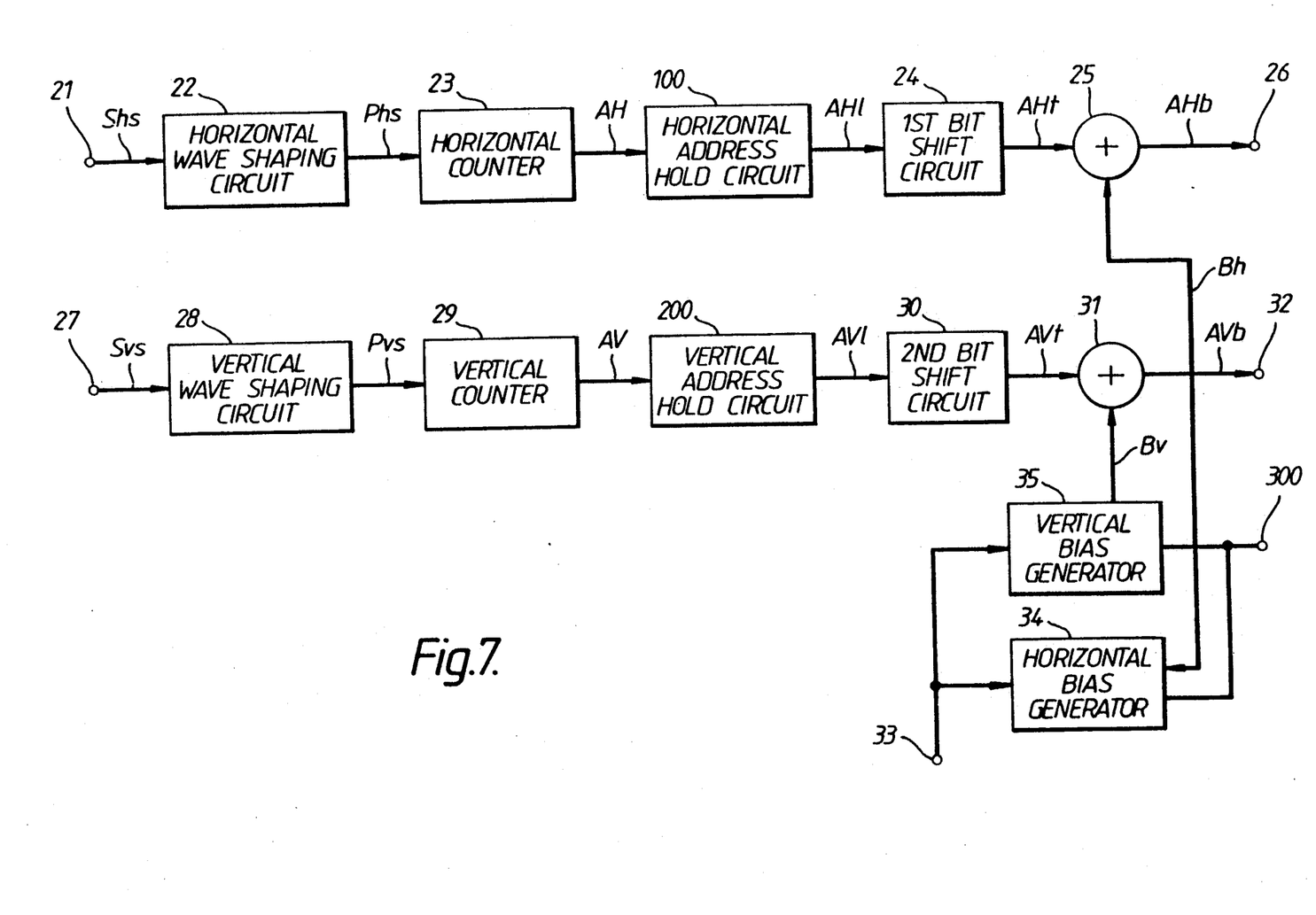
FIG. 7 is a block diagram showing an embodiment of an address control circuit of a video memory according to the present invention.

Referring now to FIG. 7, a first embodiment of the address generator according to the present invention will be described in detail. In FIG. 7, the improved address generator has two input terminals 21 and 27. These input terminals 21 and 27 are provided for receiving the horizontal and the vertical sync signals Shs and Svs from the sync separator 4 (see FIG. 1).

The horizontal sync signal Shs is placed in a horizontal blanking period between two successive video image signals Svi (see FIG. 5). The horizontal blanking period comprises a leading blanking period TY in the front of a video image period TX and a following blanking period TZ in the rear of a preceding video image period TX. The video signals Svi occur in every horizontal scanning periods TS of the composite video signals Scv. The horizontal sync signal Shs is applied to a horizontal wave shaping circuit 22. The horizontal wave shaping circuit 22 shapes the horizontal sync signal Shs into the horizontal sync pulse Phs (see graph Shs in FIG. 5).

The horizontal sync pulse Phs resets the horizontal counter 23. The horizontal counter 23 starts a count operation of prescribed clock signals in every reset by the horizontal sync pulse Phs. Thus, the horizontal counter 23 generates horizontal addresses AH as its count data.

Figure 9:
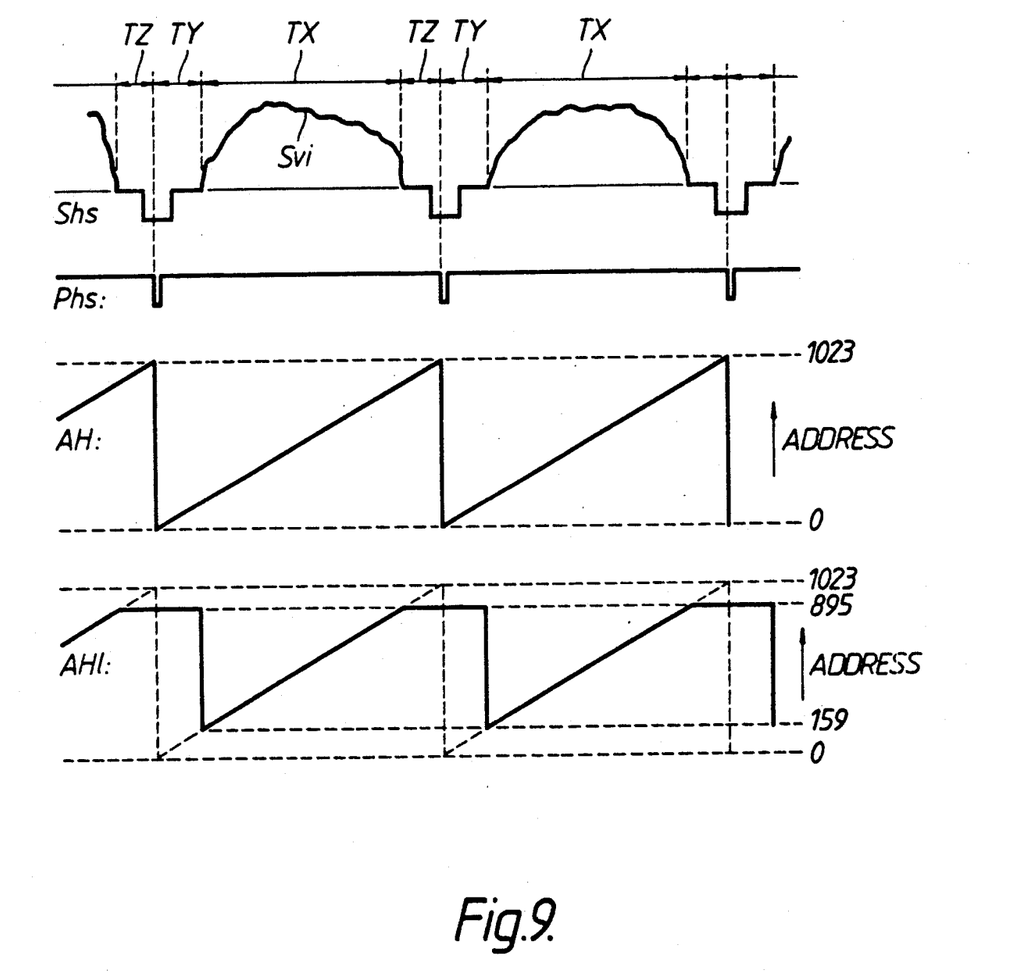
FIGS. 9, 10 and 11 are timing charts for explaining the operations of the address control circuit of FIG. 7.

Now, it is assumed that the horizontal scanning period TS starts at an address "0" and ends at an address "1023" in the horizontal addresses AH, as shown by a graph AH in FIG. 9. In FIG. 9, the graph AH is shown with other graphs indicating the composite video signal Scv, the horizontal sync pulse Phs etc. Then, the leading blanking period TY ends at an address "158". The video image period TX starts at an address "159". And the following blanking period TZ starts at an address "895". The horizontal addresses AH are supplied to a first bit shift circuit 24 through a horizontal address hold circuit 100.

Figure 8:
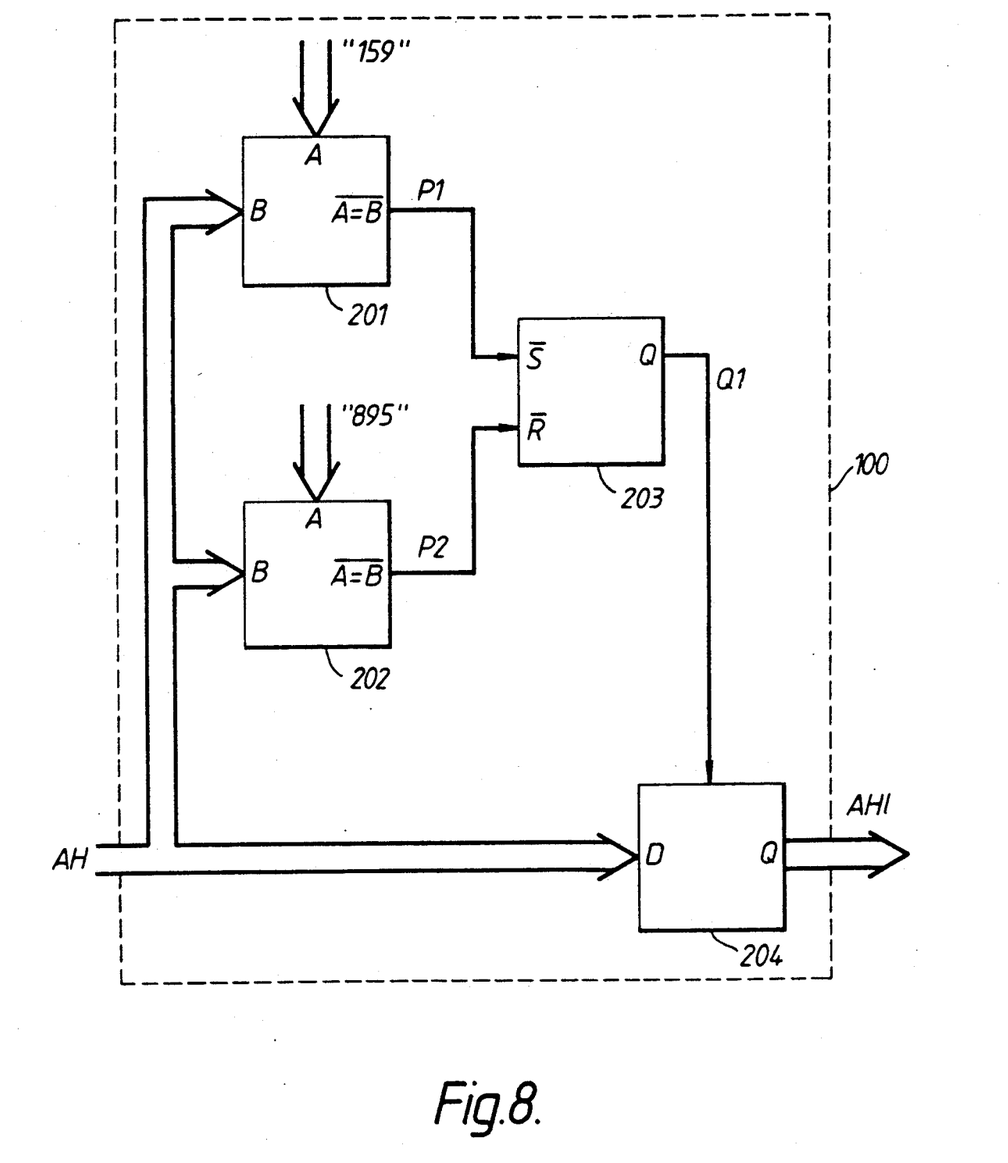
FIG. 8 is a block diagram showing a detail of the horizontal address holding circuit of FIG. 7.

The horizontal address hold circuit 100 has a detailed circuit, as shown in FIG. 8. In FIG. 8, the horizontal address hold circuit 100 includes two comparators 201 and 202, a flip-flop 203 and a latch 204. The horizontal addresses AH generated by the horizontal counter 23 are applied to the first and second flip-flops 201 and 202 and the latch 204, respectively.

The first comparator 201 compares the horizontal address AH with a first fixed value "159" corresponding to the start address of the video image period TX. The first comparator 201 produces a first coincidence pulse P1 when the horizontal address AH coincides with the first fixed value "159". The second comparator 202 compares the horizontal address AH with a second fixed value "895" corresponding to the start address of the following blanking period TZ. The second comparator 202 produces a second coincidence pulse P2 when the horizontal address AH coincides with the second fixed value "895".

The first and second coincidence pulses P1 and P2 are applied to the set terminal S and the reset terminal R of the flip-flop 203.

The flip-flop 203 supplies its output signal Q1 to a control terminal of the latch 204. The output signal Q1 of the flip-flop 203 becomes to a high level (referred to as H level hereafter), when the first coincidence pulse P1 is applied to the set terminal S. On the other hand, the output signal Q1 of the flip-flop 203 becomes to a low level (referred to as L level hereafter), when the second coincidence pulse P2 is applied to the reset terminal R.

The latch circuit 204 directly transmits the horizontal addresses AH to the first bit shift circuit 24 when the H level signal Q1 is applied. On the other hand, the latch 204 latches the horizontal addresses AH when the L level signal Q1 is applied. Thus, the latch 204 transmits the address values "159" to "894" corresponding to the video image period TX. But the value "895" corresponding to the start address of the following blanking period TZ is held in the latch 204 for the horizontal blanking period comprising the following blanking period TZ and the leading blanking period TY. Accordingly, the address output from the latch 204 varies, as shown by a graph AHl in FIG. 9. The graph AHl in FIG. 9 shows the actual change of the horizontal address.

The horizontal addresses AHl output from the latch 204 are supplied to the first bit shift circuit 24. The first bit shift circuit 24 thins out the horizontal addresses AHl to ¼ times. This thinning operation is achieved by shifting the horizontal addresses AHl by two bits. As a result, a thinned horizontal addresses AHt with values "0" to "255" are output while the horizontal addresses AHl with values, e.g., "159" to "895". The thinned horizontal addresses AHt are supplied to a first adder 25. The first adder 25 is further coupled to a horizontal bias generator 34.

The first adder 25 adds a prescribed bias value Bh supplied from the horizontal bias generator 34 to the thined horizontal addresses AHt. Thus, biased horizontal addresses AHb is obtained from the first adder 25. The biased horizontal addresses AHb are supplied to the frame memories 9, 10 and 11 (see FIG. 1) through a horizontal address output terminal 26.

Similar operations are carried out for obtaining biased vertical addresses AVb through a circuit coupled to the input terminal 27.

The vertical sync signal Svs is placed in a vertical blanking period of the composite video signal Scv. The vertical sync signal Svs is applied to a vertical wave shaping circuit 28. The vertical wave shaping circuit 28 shapes the vertical sync signal Svs into a pulse signal Pvs.

The pulse signal (referred to as vertical sync pulse hereafter) Pvs is supplied to a vertical counter 29. The vertical sync pulse Pvs resets the vertical counter 29. The vertical counter 29 starts a count operation of prescribed clock signals in every reset by the vertical sync pulse Pvs. Thus, the vertical counter 29 generates vertical addresses AV as its count data.

Figure 10:
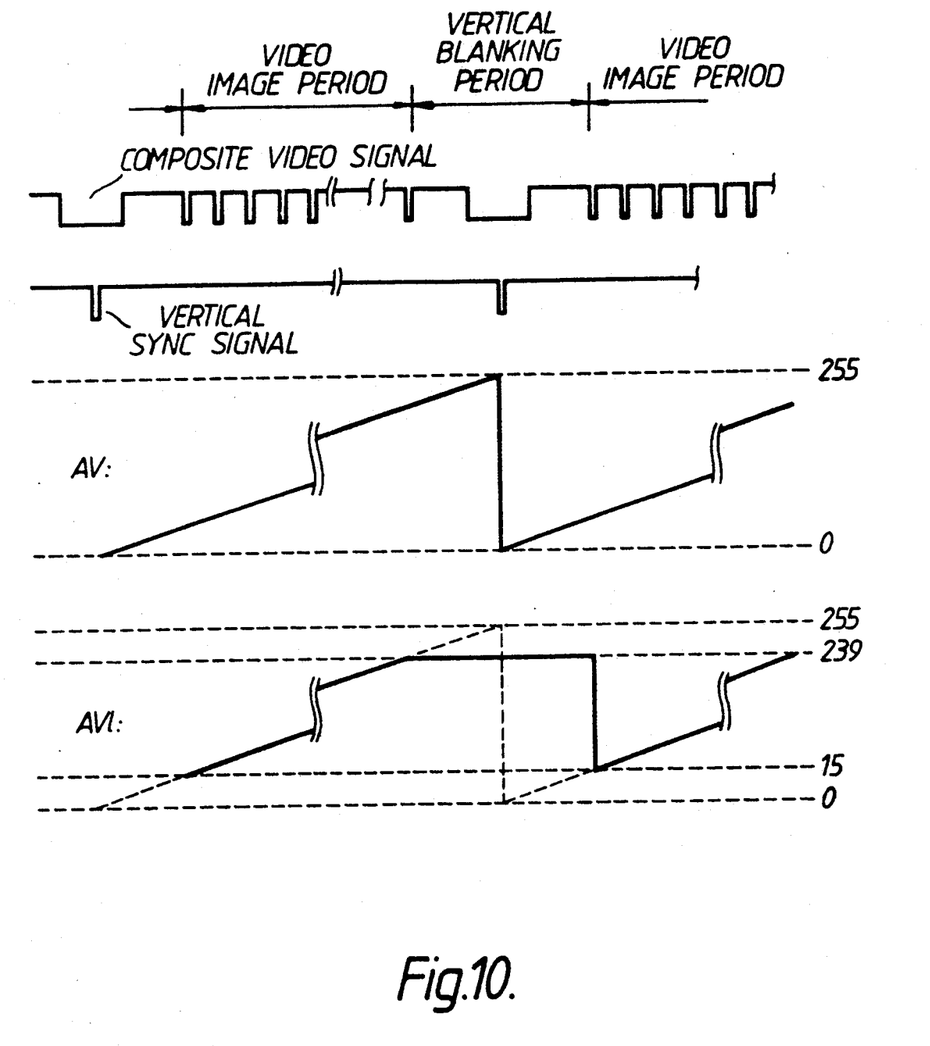

Now, it is assumed that the vertical scanning period starts at an address "0" and ends at an address "255" in the vertical addresses AV, as shown by a graph AV in FIG. 10. In FIG. 10, the graph AV is shown with other graphs indicating the composite video signal Scv for the vertical scanning period, the vertical sync pulse Pvs etc. Then, the leading vertical blanking period ends at an address "14". The vertical video image period starts at an address "15". And the following vertical blanking period starts at an address "239". The vertical addresses AV are supplied to the second bit shift circuit 30 through a vertical address hold circuit 200.

The vertical address hold circuit 200 has a detailed circuit the same as the horizontal address hold circuit 100, as shown in FIG. 8. In the circuit, as shown in FIG. 8, applied to the vertical address hold circuit 200, the first and second comparators 201 and 202 compare the vertical addresses AV with fixed values "15" and "239", respectively. Thus, the latch circuit 204 directly transmits the vertical addresses AV to the second bit shift circuit 30 when the H level signal Q1 is applied. On the other hand, the latch 204 latches the vertical addresses AV when the L level signal Q1 is applied.

Thus, the latch 204 transmits the address values "15" to "238" corresponding to the video image period of the vertical scanning period. But the value "239" corresponding to the start address of the vertical blanking period is held in the latch 204. Accordingly, the address output from the latch 204 varies, as shown by a graph AV1 in FIG. 10. The graph AV1 in FIG. 10 shows the actual change of the horizontal address.

The vertical addresses AV1 output from the latch 204 are supplied to the second bit shift circuit 30. The second bit shift circuit 30 thins out the vertical addresses AV1 to ¼ times. This thinning operation is achieved by shifting the vertical addresses AV1 by two bits. As a result, a thinned vertical addresses AVt with values "0" to "64" are output while the vertical addresses AV1 with values, e.g., "15" to "234". The thinned vertical addresses AVt are supplied to a second adder 31. The second adder 31 is further coupled to a vertical bias generator 35.

The second adder 31 adds a prescribed bias value Bv supplied from the vertical bias generator 35 to the thined vertical addresses AVt. Thus, biased vertical addresses AVb is obtained from the second adder 31. The biased vertical addresses AVb are supplied to the frame memories 9, 10 and 11 (see FIG. 1) through a vertical address output terminal 32.

The horizontal bias generator 34 and the vertical bias generator 35 are coupled to a terminal 33 for receiving a bias control signal. The bias control signal controls the horizontal bias values Bh and the vertical bias values Bv in response to a number of the channels to be displayed on the screen of the display device.

As mentioned above, the count values of the horizontal counter 23 and the vertical counter 29, i.e., the horizontal addresses AH and the vertical addresses AV accurately synchronize with the composite video signal Scv. The other horizontal address AH1 and the vertical address AV1 output from the horizontal address hold circuit 100 and the vertical address hold circuit 200 respond to only the video image signal period TX and the vertical video image periods. During the horizontal blanking period and the vertical blanking period, these addresses AH1 and AV1 are held at the address values corresponding to the start instances of the horizontal and the vertical blanking periods.

Figure 11:
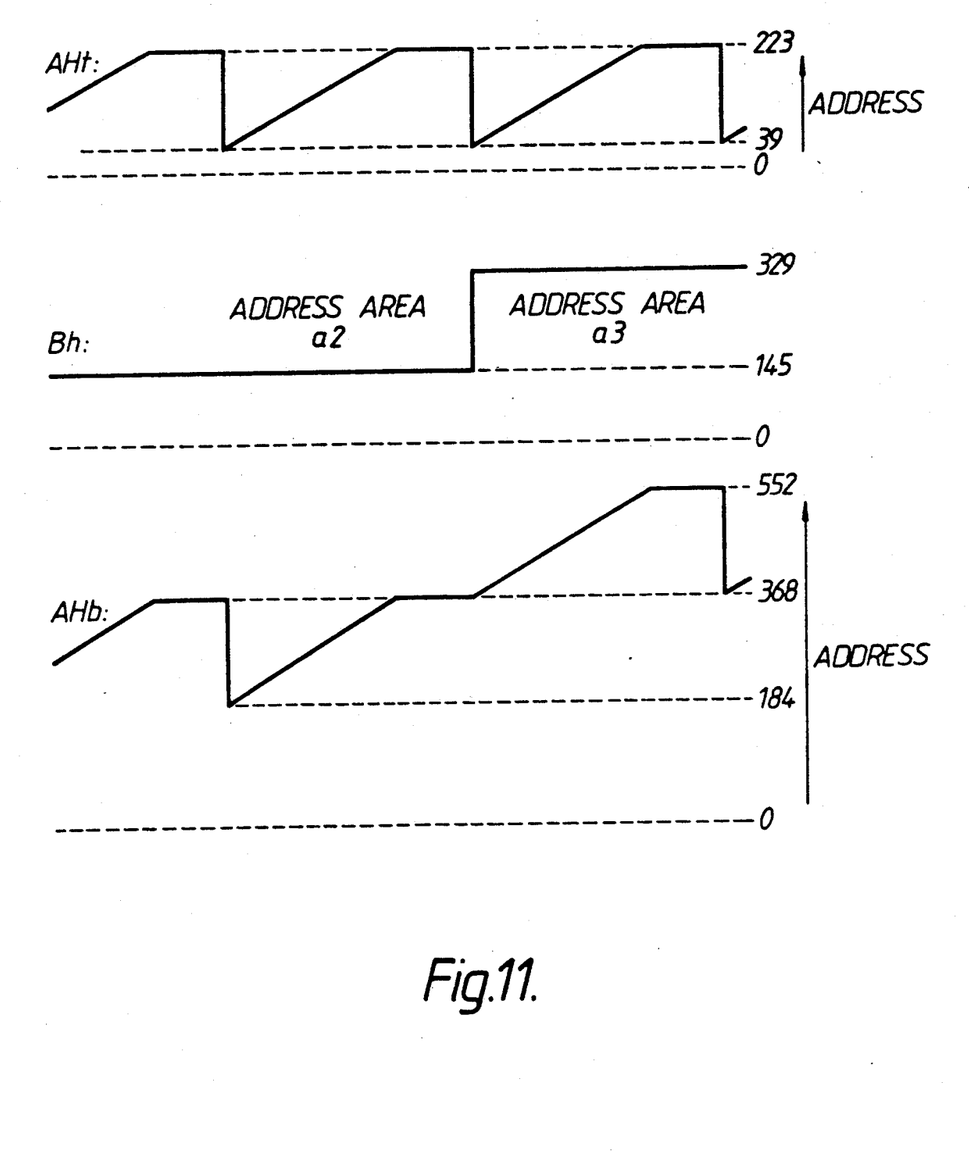

Referring now to FIG. 11, image display position setting operation in the horizontal axis of the screen S of the display device will be described in detail. Graph AH1 in FIG. 11 illustrates the thinned horizontal address AHt output from the first bit shift circuit 24. The thinned horizontal address AHt is thinned out by ¼ times from the horizontal address hold circuit 100. The thinned horizontal address AHt is added with the horizontal bias value Bh, as shown by a graph Bh in FIG. 11, at the first adder 25. Thus, a biased horizontal addresses AHb, as shown by a graph AHb in FIG. 11, is obtained. The graph of the biased horizontal addresses AHb shows the state that the address AHb is designated from the address area a2 to the address area a3, as shown in FIG. 12a, on the frame memories 9, 10 and 11 (see FIG. 1).

Figure 12A:
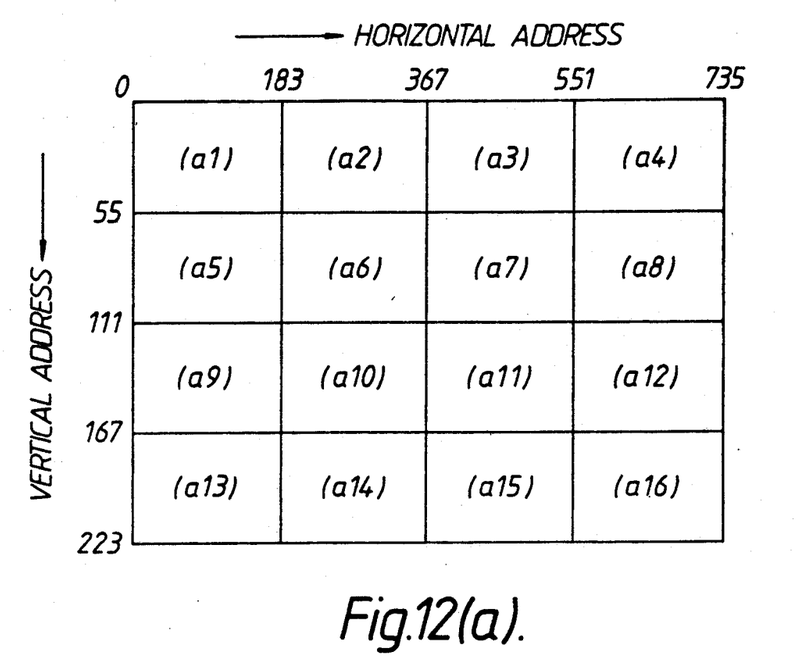
FIGS. 12(a) and 12(b) are diagrams showing a memory map of the frame memories and address bias values for the frame memories controlled by the address control circuit of FIG. 7.

FIG. 12(a) shows one example of the memory address map for displaying the multi-image system image according to the first embodiment. In this example, each required memory capacity of the memories 9, 10 and 11 in compared to the conventional system is calculated as follows;

$$(736 \times 224)/(1024 \times 8256) = 63\%$$

Figure 13A:
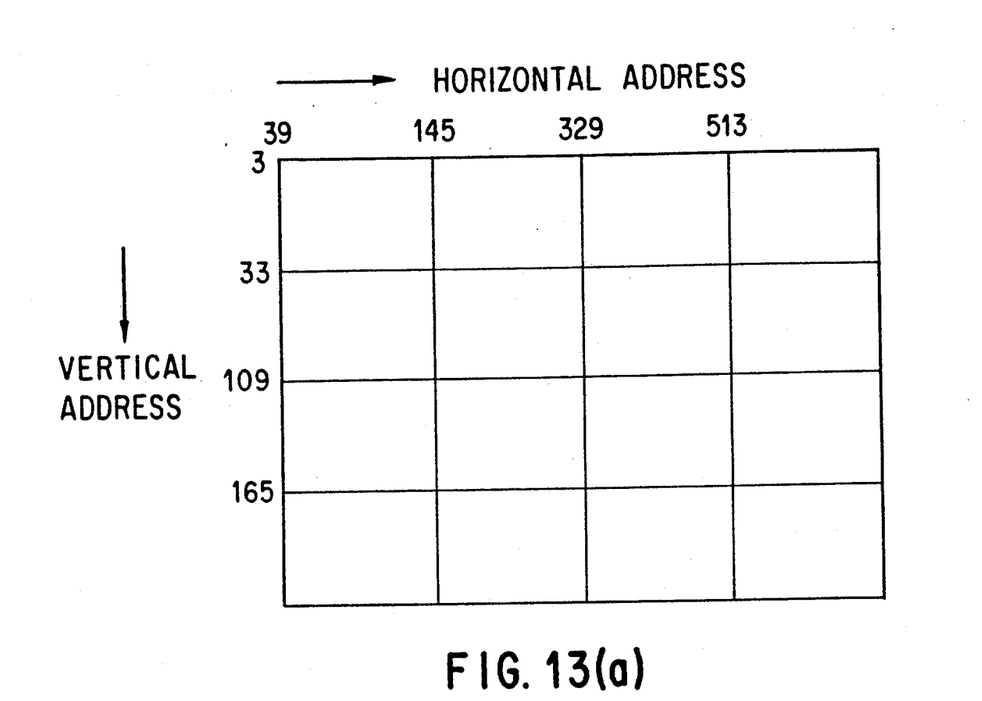
FIGS. 13(a) and 13(b) are diagrams showing a memory map of the frame memories and address bias values for the frame memories controlled by a second embodiment of the address control circuit according to the present invention.

In the case where reduced image data for a certain received channel is written into the address area a2 of the memory address map, the horizontal and vertical bias values Bh and Bv are shown in FIG. 13(a). When the writing operation into the address area a2 ends, the other received channel is stored in the adjacent address area a3, by changing the horizontal and vertical bias values Bh and Bv. These bias values Bh and Bv are decided for every address areas a1 to a16. The bias control is carried out by a control signal applied through a terminal 33 coupled to the horizontal and the vertical bias generators 34 and 35. In FIG. 7, the address control circuit is provided with another bias control terminal 300. The bias control terminal 300 is used for supplying substitute bias values according to the viewer's option.

Figure 12B:
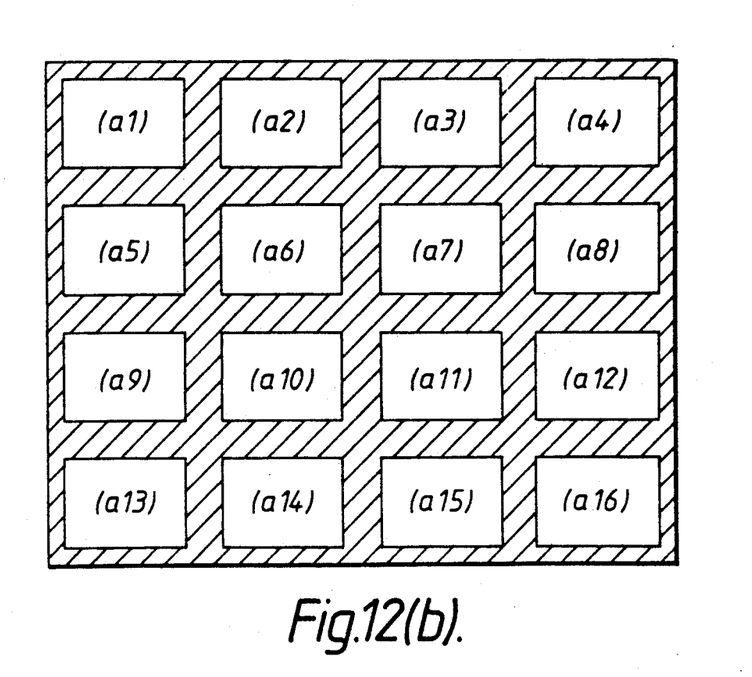
Figure 13B:
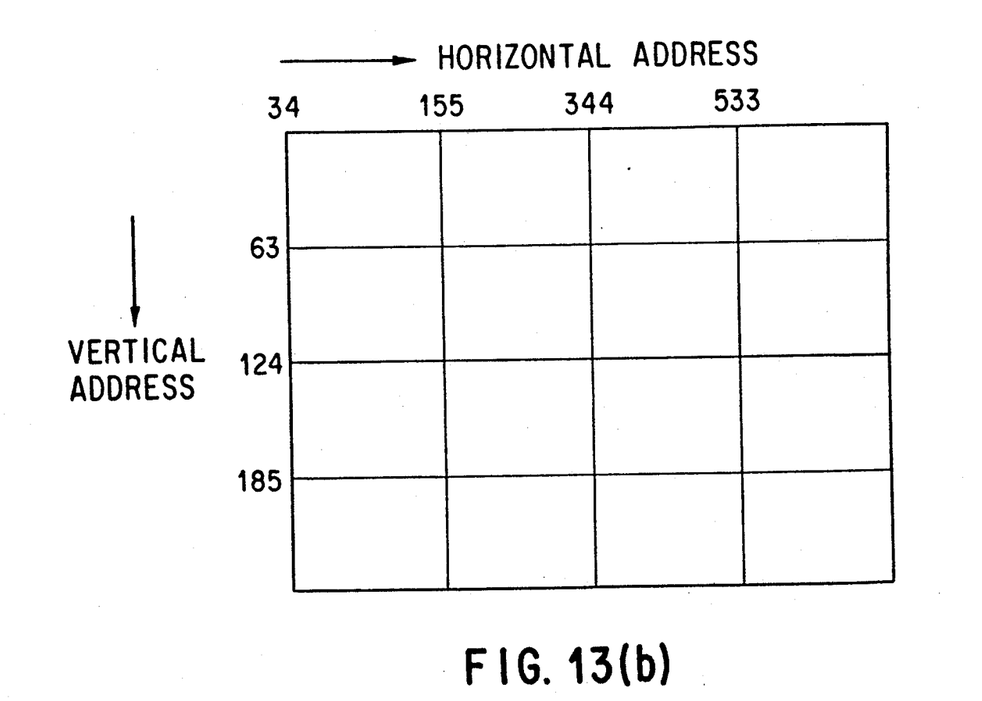

Further, if the memory capacity is made to the same as FIG. 3, a margin of the hatching line area, as shown in FIG. 12(b), is obtained by modifying the bias value generators 34 and 35. The hatching line area can be used for displaying additional information, for instance, a prescribed colors for fringing each of the image areas p1 to p16. FIG. 13(b) shows examples of the horizontal and vertical bias values Bh and Bv when performing this color fringing.

Further, timings of the changes of the received channels can be easily detected. Thus, data identifying the channels displayed in each image areas p1 to p16 can be indicated on the hatching line area.

The above explanations are made for simultaneously displaying multiple different channel images. However, the present invention can be applied to other identical display systems.

As described above, the present invention can provide an extremely preferably address control circuit for a video memory of a multi-image display system.

While there have been illustrated and described what are at present considered to be preferred embodiments of the present invention, it will be understood by those skilled in the art that various changes and modifications may be made, and equivalents may be substituted for elements thereof without departing from the true scope of the present invention.

In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An address control circuit for a video memory of a multi-image display system comprising:
   means for supplying a video signal;
   a video memory for storing the video signal;
   a holding circuit for selectively holding write addresses of the video memory, and generating a held address value during a blanking period or a current address value during a video image period; and
   a bias generating circuit, responsive to the holding circuit, for positioning address areas of the video memory in which the video signal is stored.

2. An address control circuit according to claim 1, wherein the holding circuit includes
   an input address bus;
   a first comparator having a first input coupled to the input address bus, a second input coupled to a first comparison address, and an output for generating a signal indicating whether the input address equals the comparison address;
   a second comparator having a first input coupled to the input address bus, a second input coupled to a second comparison address, and an output for generating a signal indicating whether the input address equals the comparison address;
   a flip-flop having a set input coupled to the output of the first comparator, a reset input coupled to the output of the second comparator, and an output indicating whether the flip-flop is in the set state; and
   a latch having a data input bus coupled to the input address bus, a control input coupled to the output of the flip-flop, and an output address bus for generating a signal corresponding to the input address bus when the flip-flop is in the set state and for generating a signal corresponding to a latched value of the input bus when the flip-flop is in the reset state.

3. An address control circuit according to claim 2, wherein the bias generating circuit includes
   a bias generator having an output for generating an address bias value signal;
   an adder having a first input coupled to the output of the holding circuit, a second input coupled to the output of the bias generator, and an output.

4. The address control circuit according to claim 3 and further including
   means, responsive to the latch, for dividing the address bus signal by a factor, and generating a divided signal.

5. An address control circuit according to claim 4 wherein the bias generator includes means for generating a series of values, the difference between adjacent values being substantially equal to the ratio of the difference between the second comparison address and the first comparison address, to the factor.

6. An address control circuit according to claim 4 wherein the bias generator includes means for generating a series of values, the difference between adjacent values being substantially equal to a number greater than the ratio of the difference between the second comparison address and the first comparison address, to the factor.

7. An address control circuit according to claim 4, wherein the bias generating circuit includes means for generating a series of values, the difference between adjacent values varying with the image being currently processed.

* * * * *